(12) United States Patent
Xu et al.

(10) Patent No.: US 11,689,286 B1
(45) Date of Patent: *Jun. 27, 2023

(54) FULL DIMENSIONAL SKEW ESTIMATION USING CROSS-CORRELATION MATRIX ANALYSIS

(71) Applicant: Cable Television Laboratories, Inc., Louisville, CO (US)

(72) Inventors: Mu Xu, Broomfield, CO (US); Junwen Zhang, Broomfield, CO (US); Haipeng Zhang, Broomfield, CO (US); Zhensheng Jia, Superior, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,868

(22) Filed: Dec. 3, 2021

Related U.S. Application Data

(63) Continuation of application No. 17/166,611, filed on Feb. 3, 2021, now Pat. No. 11,223,421.

(60) Provisional application No. 62/969,344, filed on Feb. 3, 2020.

(51) Int. Cl.
*H04B 10/00* (2013.01)
*H04B 10/2507* (2013.01)
*H04B 10/58* (2013.01)

(52) U.S. Cl.
CPC ......... *H04B 10/2507* (2013.01); *H04B 10/58* (2013.01)

(58) Field of Classification Search
CPC .... H04B 10/2507; H04B 10/58; H04B 10/40; H04B 10/541; H04B 10/548; H04B 10/516; H04B 10/613; H04B 10/614; H04B 10/616; H04B 10/6163
USPC ....... 398/183, 188, 184, 158, 159, 154, 155, 398/193, 194, 195, 202, 208, 209, 205, 398/206, 207, 25, 26, 27, 33, 38, 135, 398/136, 161, 65, 152
See application file for complete search history.

(56) References Cited

U.S. PATENT DOCUMENTS

| | | | |
|---|---|---|---|
| 10,805,009 B2 | 10/2020 | Hayashi et al. | |
| 11,223,421 B1 * | 1/2022 | Xu | H04B 10/58 |
| 2012/0263456 A1 * | 10/2012 | Tanaka | H04B 10/5055 398/25 |
| 2018/0083707 A1 * | 3/2018 | Fan | H04B 10/5057 |
| 2020/0052795 A1 | 2/2020 | Morie | |

* cited by examiner

*Primary Examiner* — Hanh Phan
(74) *Attorney, Agent, or Firm* — Elevated IP, LLC (57) ABSTRACT

A skew compensation system for a coherent optical communication network includes a transmitter and a receiver in operable communication with an optical transport medium of a coherent optical network. The transmitter includes a first transmitter-side tunable delay line configured to delay transmission of a first signal by a first skew amount, thereby producing a pre-compensated first signal. The receiver includes a first receiver-side tunable delay line configured to delay transmission of the pre-compensated first signal to a digital signal processor (DSP) of the receiver by a second skew amount, thereby producing a final signal that is both pre-compensated and post-compensated (i.e., fully compensated).

20 Claims, 5 Drawing Sheets

FULL DIMENSIONAL SKEW ESTIMATION USING CROSS-CORRELATION MATRIX ANALYSIS

CROSS REFERENCE TO RELATED APPLICATIONS

This application is a continuation of U.S. patent application Ser. No. 17/166,611, filed Feb. 3, 2021, which claims the benefit of and priority to U.S. Provisional Patent Application Ser. No. 62/969,344, filed Feb. 3, 2020, both of which are incorporated herein by reference in their entirety.

BACKGROUND

The field of the disclosure relates generally to fiber communication networks, and more particularly, to coherent optical networks exhibiting skew or sampling timing offset.

The recent development of digital coherent optical systems and algorithms in long-haul transmission links significantly increased the capacity of next-generation optical transport networks (OTNs). To embrace future broadband access, network, data center inter/intra connects, and 5 G mobile backhaul, high-speed coherent OTNs with net bit rates of 200, 400, and even 600 Gbit/s are the key technology, which could significantly boost the capacity of next-generation core networks. However, following the increase of the transmission speed and implementation of higher-order quadrature amplitude modulation (QAM), penalties brought by the timing mismatch, or skews, among multiple channels become more severe. For example, skews of 3 ps between the in-phase (I) and quadrature (Q) signals of one polarization will significantly degrade the error vector magnitude (EVM) in a 64-Gbaud 16-QAM coherent transmission system by around 5.5 ppts and the digital signal processing (DSP) will fail to recover the clock of the signal when a 5 ps skew exists. Accordingly, there is a need to address these skew problems for high-speed coherent OTNs.

BRIEF SUMMARY

In U.S. patent application Ser. No. 16/573,872, we proposed use of a cross-correlation method to detect skew, and a frequency-domain skew pre-compensation technique based on fast Fourier transform. However, this scheme can only mitigate the timing mismatch at the transmitter site. When skews are introduced at both the transmitter and receiver sites, the problem becomes significantly more complex because delays at both sites will be mixed up by polarization multiplexing and de-multiplexing. The randomness of phase noise further complicates the problem. Here, to improve the skew tolerance of a high-speed coherent transmission system, we disclose a full-dimensional skew detection method and apparatus based on cross-correlation matrix analysis.

The disclosed methods differentiate the transmitter-side and receiver-side skews of multiple signals transmitted and received by a high-speed coherent optical communication system. The transmitter skew and receiver skew are tested simultaneously using the same test signals; the transmitter components and receiver components are not isolated for independent testing. In an embodiment, when N signals are transmitted and N signals are received, a full dimensional skew analysis provides 2N skew terms. In a typical coherent optical network four channels transmit four signals detected at four receivers, and a full dimensional skew analysis is eight dimensional. The methods disclosed herein use known values of transmitted test signals, as described in U.S. patent application Ser. No. 16/573,872, which are detected by a receiver(s) of an OTN. Using these known values (transmission times and detection times), the methods disclosed herein utilize a cross-correlation matrix to enable the determination of time domain skew on each individual transmission line and each individual receiver line. A joint pre-compensation and post-compensation technique is then disclosed to eliminate the timing skews at both the transmitter and receiver. Although this disclosure addresses time domain skews, these same methods and compensation techniques may be applied to the frequency domain.

It is envisioned that an OTN would be tested, using training sequences as described in U.S. patent application Ser. No. 16/573,872, upon set-up, and that thereafter the OTN would be stable enough to render further testing unnecessary (i.e., the pre-compensation and post-compensation skew values for a given OTN are not expected to change over time). However, periodic testing or re-testing, for example, after upgrades or repairs to the system, may be desirable.

In an embodiment, a skew compensation system for a coherent optical communication network includes a transmitter and a receiver in operable communication with an optical transport medium of a coherent optical network. The transmitter comprises a first transmitter-side tunable delay line configured to delay transmission of a first signal by a first skew amount, thereby producing a pre-compensated first signal. The receiver comprises a first receiver-side tunable delay line configured to delay transmission of the pre-compensated first signal to a digital signal processor (DSP) of the receiver by a second skew amount, thereby producing a final signal that is both pre-compensated and post-compensated. The tunable delay lines at the transmitter and receiver site can be realized by delay tunable cables, integrated delay-control circuits, a time-domain signal processing approach, or a frequency-domain signal processing approach. One or more processors of the coherent optical communication network is/are configured to (i) determine the first skew amount between a reference signal and the first signal at the transmitter, (ii) calculate a pre-compensation value corresponding to the first skew amount, (iii) tune the first transmitter-side tunable delay line to reduce the first skew amount according to the pre-compensation value; (iv) determine a second skew amount between the pre-compensated first signal and the reference signal at the receiver, (v) calculate a post-compensation value corresponding to the second skew amount, and (vi) tune the first receiver-side tunable delay line to reduce the second skew amount according to the post-compensation value. This method contemplates the first skew amount and the second skew amount being obtained from the same test data.

Figure 2:
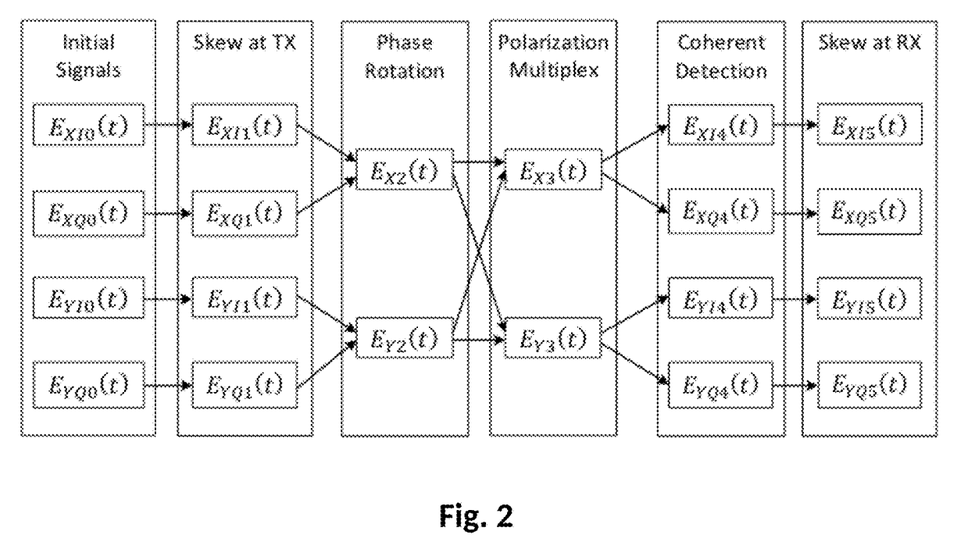
FIG. 2 is a flow diagram of optical signal transmission in coherent systems, such as that depicted in FIG. 1.

In an embodiment, the first signal is polarization multiplexed with the reference signal upstream of the receiver. Further, when more than two channels are present in the coherent optical network or OTN, each of the input signals may be polarization multiplexed with each of the other signals (as shown in FIG. 2). Polarization multiplexing, or mixing of the input signals, makes it impossible to correct for all of the skew in an OTN only at the transmitter or only at the receiver. The present systems and methods solve this problem.

In an embodiment, a transmitter further includes a second transmitter-side tunable delay line configured to delay transmission of a second signal by a third skew amount, thereby producing a pre-compensated second signal and/or a third transmitter-side tunable delay line configured to delay transmission of a third signal by a fifth skew amount, thereby producing a pre-compensated fifth signal. In an embodiment, a receiver further includes a second receiver-side tunable delay line configured to delay transmission of the pre-compensated second signal to the DSP by a fourth skew amount and/or a third receiver-side tunable delay line configured to delay transmission of the pre-compensated third signal to the DSP by a sixth skew amount. In an embodiment, the first, second, and third receiver-side tunable delay lines are each disposed between analog to digital converters (ADC) and the DSP.

In an embodiment, the third skew amount, the fourth skew amount, the fifth skew amount, and the sixth skew amount are each determined relative to the reference signal.

In an embodiment, the transmitter further comprises one or more of: a dual-polarization (DP)/in-phase (I)/quadrature (Q) (DP-IQ) modulation unit; a driver disposed between (i) the DP-IQ modulation unit and (ii) the first, second, and third transmitter-side tunable delay lines; a digital to analog converter (DAC) disposed between (i) the driver and (ii) the first, second, and third transmitter-side tunable delay lines; a first channel having an X-polarization component, a second channel having a Y-polarization component, a third channel having an I-phase component, and a fourth channel having a Q-phase component; and a sampling unit disposed between (i) the first, second, third, and fourth channels and the first, second, and third transmission-side tunable delay lines.

In an embodiment, the reference signal substantially includes XI data, the first signal substantially includes XQ data, a second signal substantially includes YI data, and a third signal substantially includes YQ data.

In an embodiment, the DP-IQ modulation unit further comprises a polarization beam splitter disposed at a source input to receive a continuous wave source signal and a polarization beam combiner at an output.

In an aspect, a method of synchronizing signals transmitted from a transmitter to a receiver in operable communication with one another through an optical transport medium of a coherent optical communication network comprises: processing a reference signal and a first signal each detected at the receiver to determine a first skew amount contributed by the transmitter and a second skew amount contributed by the receiver; providing a first transmitter-side tunable delay line delaying transmission of the first signal by the first skew amount, thereby producing a pre-compensated first signal; and providing a first receiver-side tunable delay line delaying transmission of the pre-compensated first signal to a digital signal processor (DSP) of the receiver by the second skew amount, thereby producing a final signal that is both pre-compensated and post-compensated.

In an embodiment, a coherent optical communication network comprises a passive optical network (PON) system architecture. For example, a PON system architecture may be configured for communication according to a data over cable service interface specification (DOCSIS) protocol.

In an embodiment, first, second, third, and fourth signals conform to a quadrature amplitude modulation (QAM) format. In an embodiment, first, second, third, and fourth signals conform to a 4-level pulse amplitude modulation (PAM4) format.

In an embodiment, the transmitter is disposed in at least one of a modem termination system (MTS) and a modem. In an embodiment, the MTS comprises an optical line terminal (OLT). In an embodiment, the modem comprises an optical network unit (ONU).

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more of a cable modem (CM), a satellite modem, an optical network unit (ONU), a DSL unit, etc., which may be individually or collectively referred to as modems.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

As described herein, "pre-compensation" and "post-compensation" refer to skew compensation techniques applied within a transmitter or receiver, respectively. Pre-compensation of a signal typically occurs before the signal enters an optical transport medium, such as long-distance fiber transmission line, whereas post-compensation of a signal is applied to a pre-compensated signal received from the optical transport medium.

The systems and methods described herein address and solve the conventional high-speed/high-format order challenges, described above, through a novel multi-lane skew detection process and pre-compensation and post-compensation units that are based on modulus cross-correlation and frequency-domain time tuning. The skew detection and pre-compensation and post-compensation techniques of the present embodiments thus effectively suppress the penalties seen according to conventional proposals due to the timing mismatch or skew. In some embodiments, skew detection is implemented by a processor of the MTS (or modem) and/or by a processor of the receiver end (or ONU). In other embodiments, skew detection may be implemented by a separate functional unit in operable communication with the respective transmitter and/or receiver. Similarly, the pre-compensation unit may be integral to the hardware and/or programming of the respective transmitter, or may be a separate unit, and the post-compensation unit may be integral to the hardware and/or programming of the respective receiver, or may be a separate unit.

Methods of producing and detecting training signals for dual-polarization, four-dimensional coherent optical systems are disclosed in U.S. patent application Ser. No. 16/573,872, which is incorporated herein by reference in its entirety. Methods of determining modulus/absolute values of complex signals and peak searching to quantify skew are also disclosed. These methods are extended herein to dual-polarization, eight-dimensional coherent optical systems.

Multi-Delay-Line Model of Skews in Coherent Systems

Figure 1:
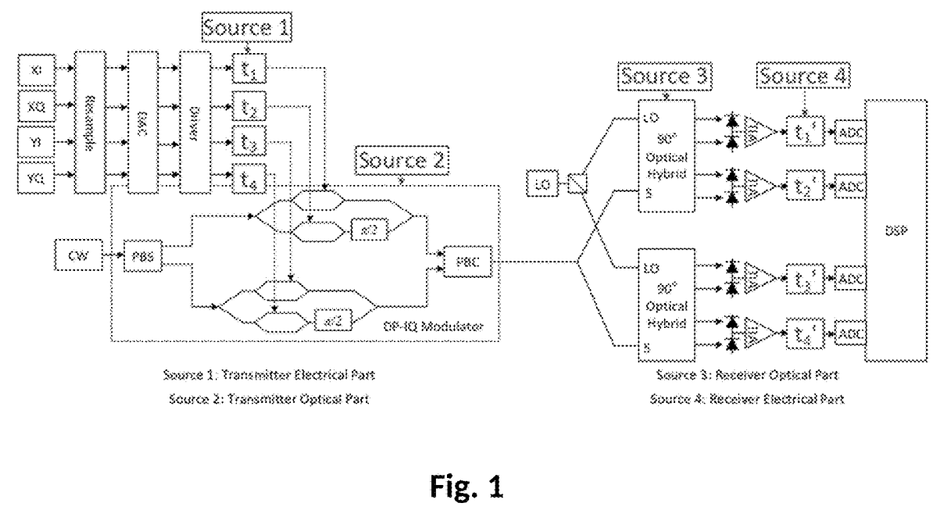
FIG. 1 is a schematic illustration depicting sources of skew in a coherent optical system.

Skews from different sources can be introduced at both the transmitter and receiver sites of the coherent optical system, which is modeled as shown in FIG. 1, which is a schematic illustration depicting sources of skew in a coherent optical system. At the transmitter site, the timing skews ($t_1$, $t_2$, $t_3$, and $t_4$) are caused by the phase mismatch of the electrical cables and optical waveguides, which could result from fabrication errors and misalignments. Given two polarization states of X and Y, and two orthogonal phase states of in-phase (I) and quadrature (Q), it is worth noting that $t_1$, $t_2$, $t_3$, and $t_4$ correspond to the skews on the XI, XQ, YI, and YQ components of the transmitted optical signals. On the other hand, the different propagation times at the optical waveguides and electrical transmission lines of the hybrid- and photo-detectors, respectively, will further introduce a series of skews ($t_1'$, $t_2'$, $t_3'$, and $t_4'$). Similarly, they correspond to the received optical signals, which are de-composited onto four orthogonal tributaries of XI', XQ', YI', and YQ'. However, because of the random polarization rotations and phase noises, XI, XQ, YI, and YQ are typically misaligned with their counterparts at the receiver site, namely, XI', XQ', YI', and YQ', respectively. Thus, there will be some crosstalk between different orthogonal components leading to the recombination of the skews at the receiver site, which significantly complicates the skew detection and clock recovery of the system.

Skew Analysis in the Coherent Optical System

FIG. 2 is a flow diagram of optical signal transmission in a coherent optical system, such as that depicted in FIG. 1. The initial four streams of signals on the optical fields in XI, XQ, YI, and YQ are given as $E_{XI0}(t)$, $E_{XQ0}(t)$, $E_{YI0}(t)$ and $E_{YQ0}(t)$, respectively. Before entering the long-distance fiber, these four streams of signals will suffer from the skews at the transmitter site as shown in FIG. 1, which can be calculated as $$E_{XI1}(t)=E_{XI0}(t-t_1) \quad (1)$$

$$E_{XQ1}(t)=E_{XQ0}(t-t_2) \quad (2)$$

$$E_{YI1}(t)=E_{YI0}(t-t_3) \quad (3)$$

$$E_{YQ1}(t)=E_{YQ0}(t-t_4) \quad (4)$$

Then, after being impacted by the phase noise, the optical fields can be written as $$E_{X2}(t)=[E_{XI1}(t)+jE_{XQ1}(t)]\exp(j\theta_X)=[E_{XI0}(t-t_1)+jE_{XQ0}(t-t_2)]\exp(j\theta_X) \quad (5)$$

$$E_{Y2}(t)=[E_{YI1}(t)+jE_{YQ1}(t)]\exp(j\theta_Y)=[E_{YI0}(t-t_3)+jE_{YQ0}(t-t_4)]\exp(j\theta_Y) \quad (6)$$

In the next step, the signals on different polarizations are further combined through polarization multiplexing, which is modeled as $$E_{X3}(t)=\cos(\varphi)E_{X2}+\sin(\varphi)E_{Y2}=\cos(\varphi)\exp(j\theta_X)[E_{XI0}(t-t_1)+jE_{XQ0}(t-t_2)]+\sin(\varphi)\exp(j\theta_Y)[E_{YI0}(t-t_3)+jE_{YQ0}(t-t_4)] \quad (7)$$

$$E_{Y3}(t)=-\sin(\varphi)E_{X2}+\cos(\varphi)E_{Y2}=-\sin(\varphi)\exp(j\theta_X)[E_{XI0}(t-t_1)+jE_{XQ0}(t-t_2)]+\cos(\varphi)\exp(j\theta_Y)[E_{YI0}(t-t_3)+jE_{YQ0}(t-t_4)] \quad (8)$$

At the receiver site, right after the optical coherent detection, the optical signals are projected onto the four orthogonal tributaries as $$E_{XI4}(t)=\cos(\varphi)\cos(\theta_X)E_{XI0}(t-t_1)-\cos(\varphi)\sin(\theta_X)E_{XQ0}(t-t_2)+\sin(\varphi)\sin(\theta_X)E_{YI0}(t-t_3)-\sin(\varphi)\sin(\theta_X)E_{YQ0}(t-t_4) \quad (9)$$

$$E_{XQ4}(t)=\cos(\varphi)\sin(\theta_X)E_{XI0}(t-t_1)+\cos(\varphi)\cos(\theta_X)E_{XQ0}(t-t_2)+\sin(\varphi)\sin(\theta_X)E_{YI0}(t-t_3)-\sin(\varphi)\sin(\theta_X)E_{YQ0}(t-t_4) \quad (10)$$

$$E_{YI4}(t)=-\sin(\varphi)\cos(\theta_X)E_{XI0}(t-t_1)+\sin(\varphi)\sin(\theta_X)E_{XQ0}(t-t_2)+\cos(\varphi)\cos(\theta_X)E_{YI0}(t-t_3)-\cos(\varphi)\sin(\theta_X)E_{YQ0}(t-t_4) \quad (11)$$

$$E_{YQ4}(t)=-\sin(\varphi)\sin(\theta_X)E_{XI0}(t-t_1)-\sin(\varphi)\cos(\theta_X)E_{XQ0}(t-t_2)+\cos(\varphi)\sin(\theta_X)E_{YI0}(t-t_3)+\cos(\varphi)\sin(\theta_X)E_{YQ0}(t-t_4) \quad (12)$$

Then the skews at the receiver site are added onto the signals, which are calculated as $$E_{XI5}(t)=\cos(\varphi)\cos(\theta_X)E_{XI0}(t-t_1-t_1')-\cos(\varphi)\sin(\theta_X)E_{XQ0}(t-t_2-t_1')+\sin(\varphi)\cos(\theta_X)E_{YI0}(t-t_3-t_1')-\sin(\varphi)\sin(\theta_X)E_{YQ0}(t-t_4-t_1') \quad (13)$$

$$E_{XQ5}(t)=\cos(\varphi)\sin(\theta_X)E_{XI0}(t-t_1-t_2')-\cos(\varphi)\cos(\theta_X)E_{XQ0}(t-t_2-t_2')+\sin(\varphi)\sin(\theta_X)E_{YI0}(t-t_3-t_2')-\sin(\varphi)\cos(\theta_X)E_{YQ0}(t-t_4-t_2') \quad (14)$$

$$E_{YI5}(t)=-\sin(\varphi)\cos(\theta_X)E_{XI0}(t-t_1-t_3')-\sin(\varphi)\sin(\theta_X)E_{XQ0}(t-t_2-t_3')+\cos(\varphi)\cos(\theta_X)E_{YI0}(t-t_3-t_3')-\cos(\varphi)\sin(\theta_X)E_{YQ0}(t-t_4-t_3') \quad (15)$$

$$E_{YQ5}(t)=-\sin(\varphi)\sin(\theta_X)E_{XI0}(t-t_1-t_4')-\sin(\varphi)\cos(\theta_X)E_{XQ0}(t-t_2-t_4')+\cos(\varphi)\sin(\theta_X)E_{YI0}(t-t_3-t_4')-\cos(\varphi)\sin(\theta_X)E_{YQ0}(t-t_4-t_4') \quad (16)$$

As illustrated by Equations (13) to (16), after polarization multiplexing and random phase rotations, different optical orthogonal components with different skews are re-combined after coherent detection. Some parts of the skews are contributed by the transmitter site, while the other parts result from the receiver. In order to detect the skews in each path of both the transmitter and receiver, a cross-correlation matrix is built up, which is calculated by cross-correlate $[E_{XI0}, E_{XQ0}, E_{YI0}, E_{YQ0}]$ with $[E_{XI5}, E_{XQ5}, E_{YI5}, E_{YQ5}]^T$ as $$\begin{bmatrix} E_{XI0}(t) \otimes E_{XI5}(t) & E_{XQ0}(t) \otimes E_{XI5}(t) & E_{YI0}(t) \otimes E_{XI5}(t) & E_{YQ0}(t) \otimes E_{XI5}(t) \\ E_{XI0}(t) \otimes E_{XQ5}(t) & E_{XQ0}(t) \otimes E_{XQ5}(t) & E_{YI0}(t) \otimes E_{XQ5}(t) & E_{YQ0}(t) \otimes E_{XQ5}(t) \\ E_{XI0}(t) \otimes E_{YI5}(t) & E_{XI0}(t) \otimes E_{YI5}(t) & E_{XI0}(t) \otimes E_{YI5}(t) & E_{XI0}(t) \otimes E_{YI5}(t) \\ E_{XI0}(t) \otimes E_{YQ5}(t) & E_{XI0}(t) \otimes E_{YQ5}(t) & E_{XI0}(t) \otimes E_{YQ5}(t) & E_{XI0}(t) \otimes E_{YQ5}(t) \end{bmatrix} \quad (17)$$

Figure 3:
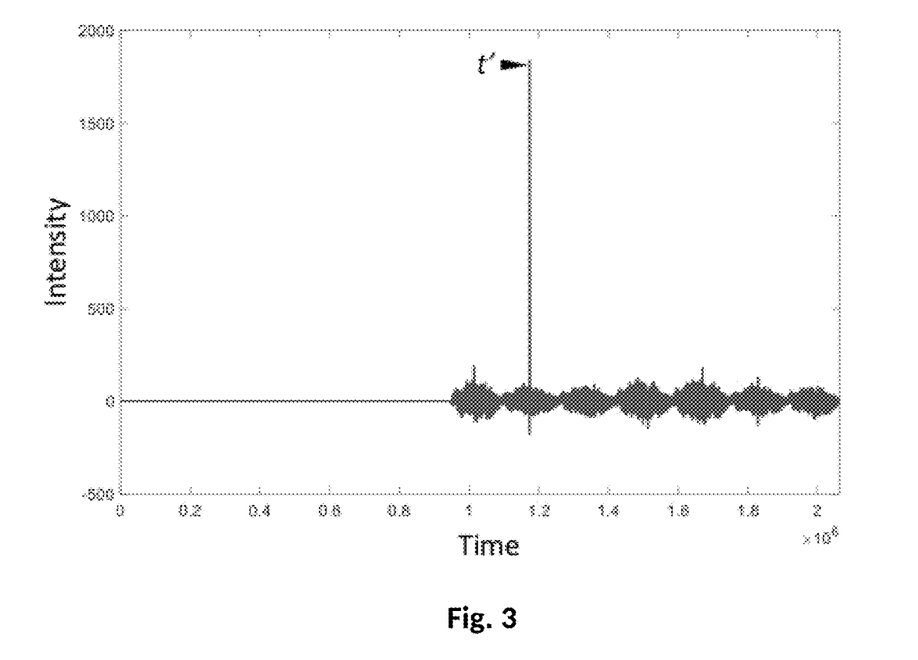
FIG. 3 is a graphical illustration depicting a peak search in the cross-correlation function.

In the cross-correlation function of the first matrix element as shown in Equation (17), when the waveform patterns between $E_{XI0}$ and $E_{XI5}$ are matched at a certain time t', there will be a peak as shown in FIG. 3, which is a graphical illustration depicting a peak search in the cross-correlation function. Based on Equations (13) to (16), the peak positions of the matrix in Equation (18) can be obtained as $$\begin{bmatrix} t_1+t_1' & t_2+t_1' & t_3+t_1' & t_4+t_1' \\ t_1+t_2' & t_2+t_2' & t_3+t_2' & t_4+t_2' \\ t_1+t_3' & t_2+t_3' & t_3+t_3' & t_4+t_3' \\ t_1+t_4' & t_2+t_4' & t_3+t_4' & t_4+t_4' \end{bmatrix} \quad (18)$$

After deduction of $t_1+t_1'$ from every element in the first row in Equation (18), we achieve the skews at the transmitter site relative to $t_1$ as $$\Delta t_1=0 \quad (19)$$

$$\Delta t_2=(t_2-t_1) \quad (20)$$

$$\Delta t_3=(t_3-t_1) \quad (21)$$

$$\Delta t_4=(t_4-t_1) \quad (22)$$

Similarly, after deduction of $t_1+t_1'$ from each element in the first column, the skews at the receiver site relative to $t_1'$ are derived as $$\Delta t_1'=0 \quad (23)$$

$$\Delta t_2'=(t_2'-t_1') \quad (24)$$

$$\Delta t_3' = (t_3' - t_1') \tag{25}$$

$$\Delta t_4' = (t_4' - t_1') \tag{26}$$

At this stage, the relative skews for the four streams of signals at both transmitter and receiver sites are detected and, based on the detected values (which form the vector of Eq. (18), the transmitter and receiver skews can be independently determined and fully compensated.

Full-Dimensional Skew Compensation in a Coherent Optical System

Figure 4:
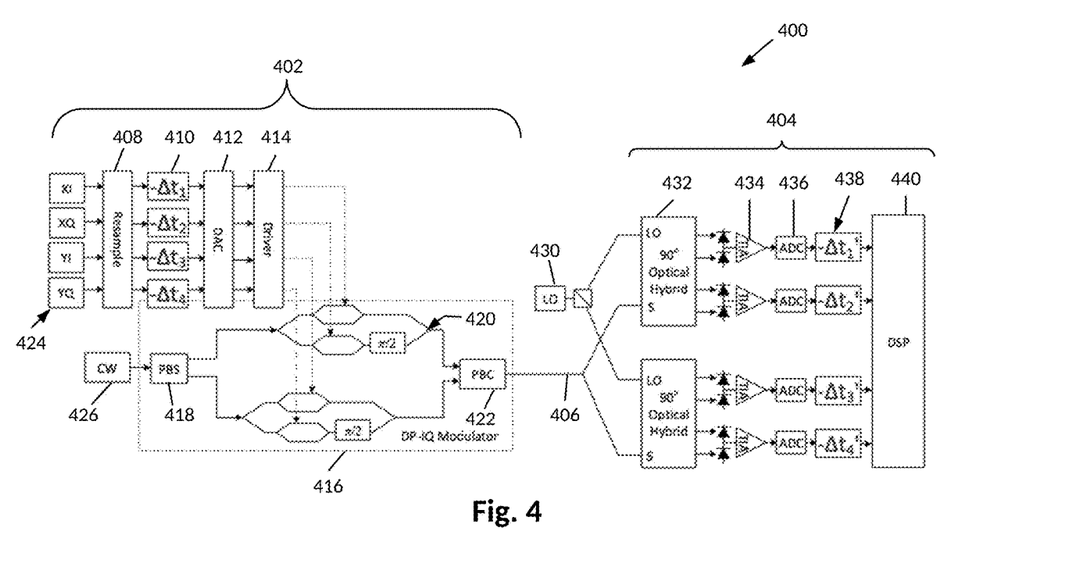
FIG. 4 is a schematic illustration depicting an exemplary full skew compensation system.
Figure 5A:
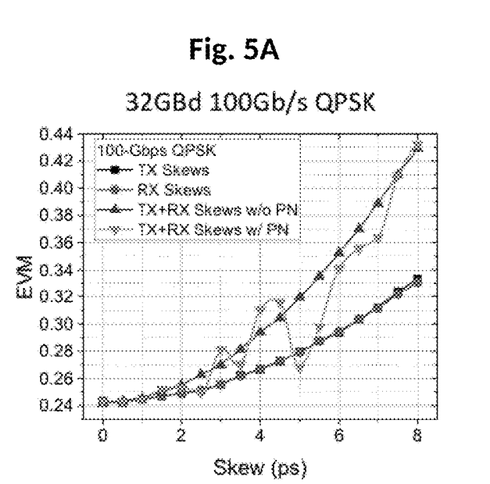
FIGS. 5A, 5B, 5C and 5D show graphical illustrations depicting simulation results of EVM with the impact of only transmitter skew, only receiver skew, both transmitter skew and receiver skew without phase noise, and both transmitter skew and receiver skew with phase noise.
Figure 5B:
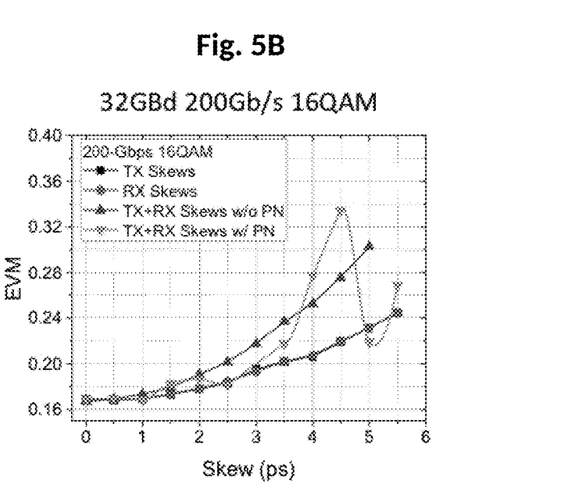
Figure 5C:
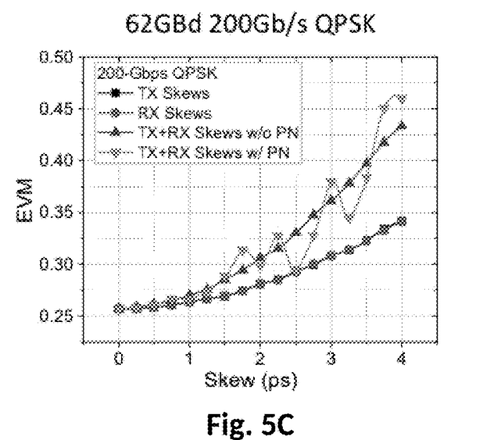
Figure 5D:
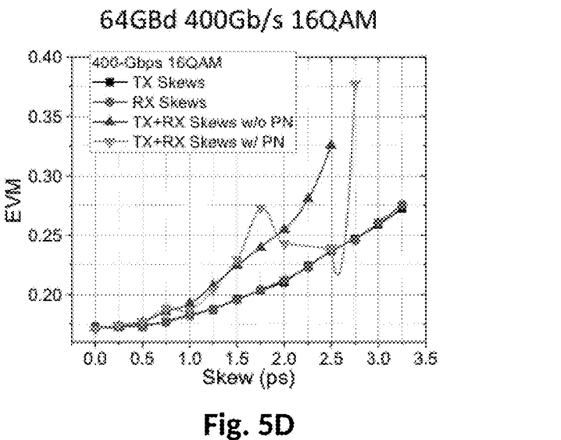

After obtaining the skew values as given in Equations (19) to (26), a skew eliminating apparatus based on joint pre- and post-compensation is set up as shown in FIG. 4, which is a schematic illustration of an exemplary full skew compensation system 400. In an exemplary embodiment, system 400 is implemented at both the transmitter side (e.g., MTS or modem) as a skew pre-compensation scheme for each of the four channels in which the amount of skew has been determined. In the example illustrated in FIG. 4, system 400 includes a transmitter side 402 in operable communication with a receiver side 404 over an optical transport medium 406 (e.g., an SMF). The person of ordinary skill in the art will understand that the several elements of system 400 that are illustrated in FIG. 4 are provided by way of illustration, and not in a limiting sense. For example, the elements shown within system 400 are not intended to be exhaustive, and the person of ordinary skill is apprised that other system network elements may be implemented in a complementary fashion with system 400, and without departing from the scope herein.

More particularly, transmitter side 402 includes a sampling unit 408 (e.g., a resampling subprocessor), one or more transmitter-side delay units 410 (four units are shown, but three units may be used when the reference signal is not time delayed), a digital-to-analog converter (DAC) 412, a driver 414, and a modulator 416. In this setup, modulator 416 includes a polarization beam splitter (PBS) 418, a dual-polarization UQ modulation unit 420 having a Mach-Zehnder modulation (MZM) architecture, and a polarization beam combiner (PBC) 422.

In exemplary operation of system 400, four channels 424 (i.e., XI, XQ, YI, YQ) are input to sampling unit 408, after which different time delays from delay units 410 are assigned to at least three of the channels 424. After resampling, the four streams of data are delayed by the values $-\Delta t_1$, $-\Delta t_2$, $-\Delta t_3$, and $-\Delta t_4$ respectively to pre-compensate the skews at the transmitter site. The several time-delayed channels may then be processed by DAC 412 and output to modulation unit 420 of modulator 416, and where PBS 418 of modulator 416 receives a continuous wave source input 426.

In further operation of system 400, receiver side 404 includes a hybrid photodetector 432 in communication with optical transport medium 406 and an LO source 430. Signals from hybrid photodetector 432 are sent to a plurality of photodetectors 434, then to analog to digital converters (ADC) 436. One or more receiver-side delay units 438 (four units are shown, but three units may be used when the reference signal is not time delayed) receive the signals from the ADC, delay them by $-\Delta t_1'$, $-\Delta t_2'$, $-\Delta t_3'$, and $-\Delta t_4'$, which is to post-compensate the skews at the receiver site, and transmit them to a digital signal processor (DSP) 440. For example, in some embodiments, the several delays at the transmitter and/or receiver may be tuned or adjusted using cascaded flip-flop buffers or inverter chains in the IC design.

The simulation results of the coherent-signal error-vector magnitude (EVM) without and with application of the disclosed skew compensation techniques are shown in FIG. 5 and FIG. 6 respectively. Given the value $t_{skew}$, the delay time of a training signal, the patterns of skews at both the transmitter and receiver are set as $[t_1, t_2, t_3, t_4] = [t_1', t_2', t_3', t_4'] = [0, t_{skew}, 0, t_{skew}]$. Four cases are considered in studying the influence of the skews, they include: the system is only affected by skews at the receiver; the system is only affected by skews at the transmitter; the system is affected by both the skews at the transmitter and receiver without adding phase noise; the system is affected by both the skews at the transmitter and receiver with adding the phase noise. FIGS. 5A, 5B, 5C and 5D show graphical illustrations depicting simulation results of EVM with the impact of only transmitter skew, only receiver skew, both transmitter skew and receiver skew without phase noise, and both transmitter skew and receiver skew with phase noise. Four modulation formats are chosen including 32-GBaud dual-polarization (DP)-QPSK (FIG. 5A), 32-GBaud DP-16QAM (FIG. 5B), 64-GBaud DP-QPSK (FIG. 5C), and 64-GBaud DP-16QAM (FIG. 5D). In Case A, B, and C of each group, it is observed that when skews exist at both transmitter and receiver sides, the EVM degradations are significantly stronger than that of the case where only single-side skews exist at either transmitter or receiver. It is worth noticing that, when phase noise is added in Case D, strong variance in the EVM curve is introduced, which makes the system performance difficult to predict. As shown in FIG. 2, since the phase noise and polarization multiplexing lead to a random re-combination among the four signal components, $E_{XI1}(t)$, $E_{XQ1}(t)$, $E_{YI1}(t)$, and $E_{YQ1}(t)$, with different skew values, the final skew is also randomly changed, which results in the random EVM performance degradations in FIG. 5.

Figure 6A:
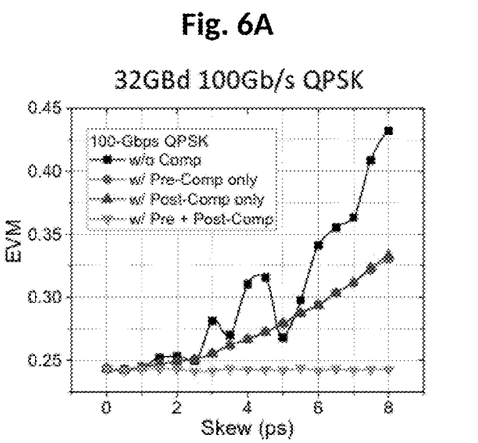
FIGS. 6A, 6B, 6C and 6D show graphical illustrations depicting simulation results of EVM with no skew compensation, only skew pre-compensation, only skew post-compensation, and both skew pre-compensation and skew post-compensation.
Figure 6B:
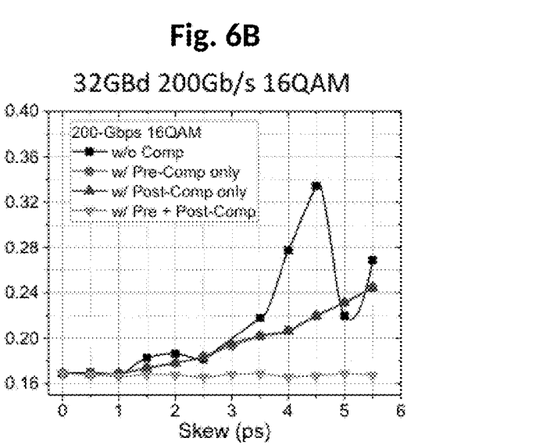
Figure 6C:
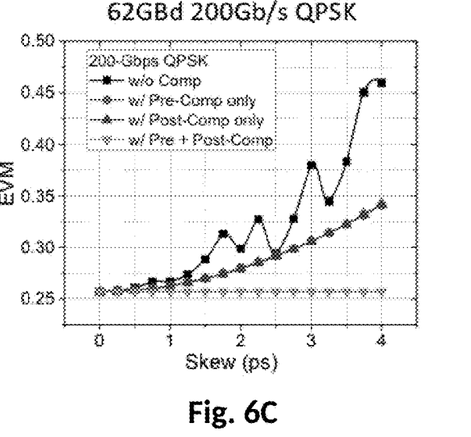
Figure 6D:
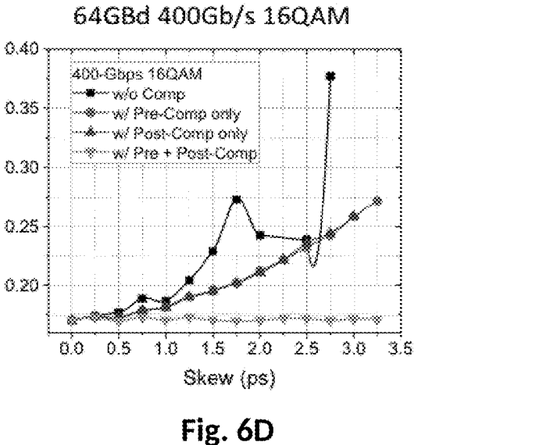

FIGS. 6A, 6B, 6C and 6D show graphical illustrations depicting simulation results of EVM with no skew compensation, only skew pre-compensation, only skew post-compensation, and both skew pre-compensation and skew post-compensation. Again, the selected modulation formats are 32-GBaud DP-QPSK (FIG. 6A), 32-GBaud DP-16QAM (FIG. 6B), 64-GBaud DP-QPSK (FIG. 6C), and 64-GBaud DP-16QAM (FIG. 6D). It can be observed, with either pre- or post-compensation, the performance can be improved since a part of the skews is eliminated. When pre- and post-compensations are jointly applied, the performance degradation is minimized and the impacts of the skew on the system become insignificant.

Exemplary embodiments of optical communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

As described above, the DOCSIS protocol may be utilized with one or more of the embodiments described herein. Additionally, the present embodiments may implement protocols such as EPON, RFoG, GPON, Satellite Internet Protocol, etc., without departing from the scope of the embodiments herein. The present embodiments are therefore particularly useful for communication systems and networks implementing a DOCSIS protocol, and may be advantageously configured for use in existing 4G and 5G networks, and also for NR and future generation network implementations.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processor (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

Figure 7:
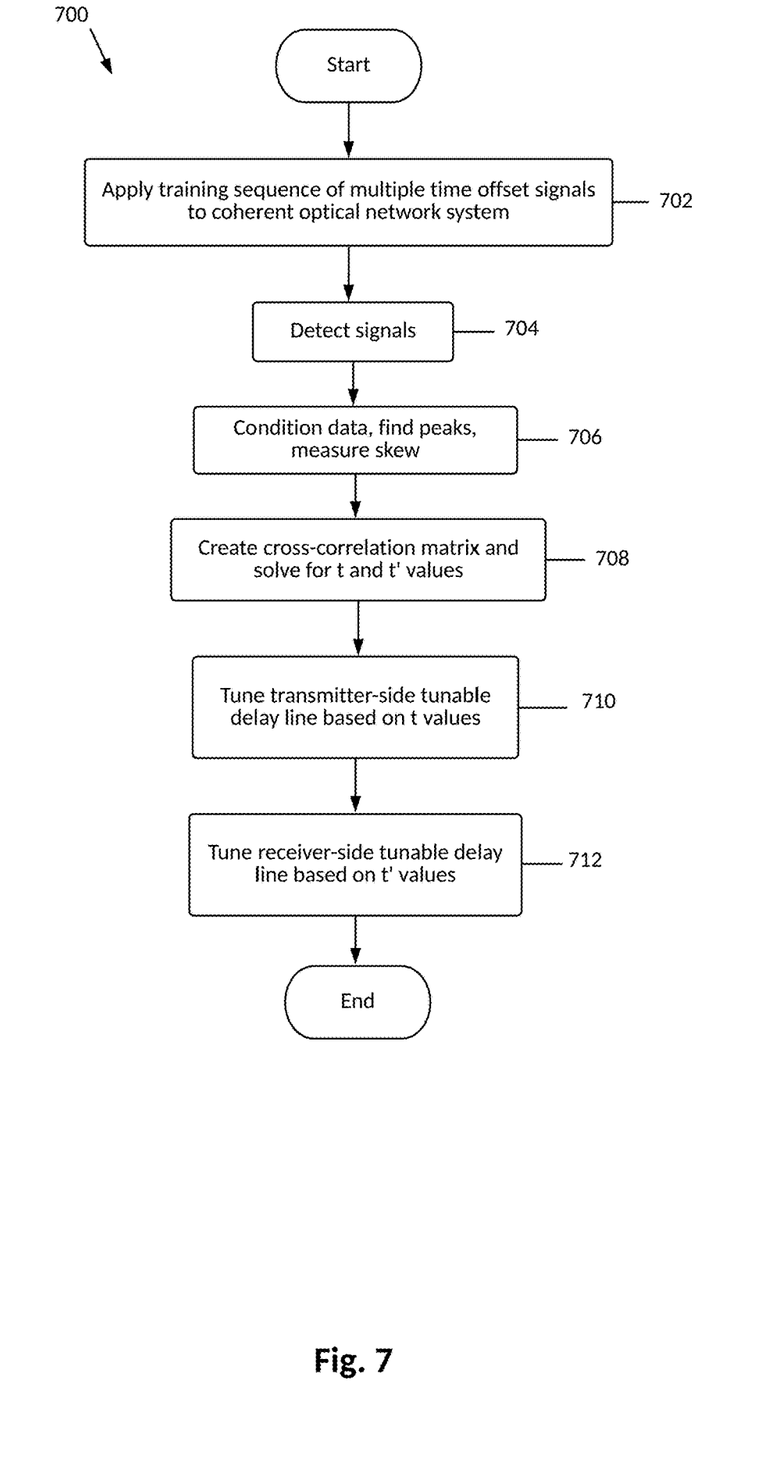
FIG. 7 is a flowchart of a method for synchronizing signals transmitted from a transmitter to a receiver in operable communication with one another through an optical transport medium of a coherent optical network or optical transport network (OTN), according to an embodiment.

FIG. 7 is a flowchart 700 of a method for synchronizing signals transmitted from a transmitter to a receiver in operable communication with one another through an optical transport medium of a coherent optical network or optical transport network (OTN), according to an embodiment. Step 702 involves applying training data including multiple time-offset signals to a coherent optical network system. In step 704, the training data signals are detected as raw data at the receiver. In optional step 706, the raw data are conditioned, for example, by performing one or more of oversampling and/or chromatic dispersion compensation. Also in step 704, peaks are identified by converting the conditioned data to the modulus and an optional auto-correlation subprocess may be performed on the modulus to obtain strong peaks. A peak searching algorithm then obtains the maximum peak value to locate the respective time positions of the peaks, and then the skew is measured as the difference between the reference signal peak and the peak of data from each channel.

In an embodiment, steps 706 and 708 describe the processing of a reference signal and a first signal each detected at the receiver (in step 704) to determine a first skew amount contributed by the transmitter and a second skew amount contributed by the receiver. Step 710 is achieved by providing a first transmitter-side tunable delay line delaying transmission of the first signal by the first skew amount, and step 712 is achieved by providing a first receiver-side tunable delay line delaying transmission of the pre-compensated first signal to a digital signal processor (DSP) of the receiver by the second skew amount.

This written description uses examples to disclose the embodiments, including the best mode, and also enables a person skilled in the art to practice the embodiments, including the production and use of any devices or systems and the performance of any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A skew compensation system, comprising:
   a transmitter and a receiver in operable communication with one another;
   the transmitter comprising a first transmitter-side tunable delay line configured to delay transmission of a first signal by a first skew amount, thereby producing a pre-compensated first signal;
   the receiver comprising a first receiver-side tunable delay line configured to delay transmission of the pre-compensated first signal to a digital signal processor (DSP) of the receiver by a second skew amount, thereby producing a final signal that is both pre-compensated and post-compensated; and
   a processor configured to solve a cross-correlation matrix for the first skew amount and the second skew amount and to tune the first transmitter-side tunable delay line by the first skew amount and the first receiver-side tunable delay line by the second skew amount.

2. The skew compensation system of claim 1, wherein the first skew amount and the second skew amount are obtained from the same test data.

3. The skew compensation system of claim 1, wherein at least one of the first transmitter-side tunable delay line and the first receiver-side tunable delay line is a delay tunable cable, an integrated delay-control circuit, time-domain signal processing, or frequency-domain signal processing.

4. The skew compensation system of claim 1, wherein the first signal is transmitted according to a protocol selected from Data Over Cable Service Interface Specification (DOCSIS), Ethernet Passive Optical Network (EPON), Radio Frequency Over Glass (RFoG), Gigabit Passive Optical Network (GPON), Satellite Internet, 4G, 5G, and 6G.

5. The skew compensation system of claim 1, wherein:
   the transmitter further includes a second transmitter-side tunable delay line configured to delay transmission of a second signal by a third skew amount, thereby producing a pre-compensated second signal, a third transmitter-side tunable delay line configured to delay transmission of a third signal by a fifth skew amount, thereby producing a pre-compensated third signal; and
   the receiver further includes a second receiver-side tunable delay line configured to delay transmission of the pre-compensated second signal to the DSP by a fourth skew amount and a third receiver-side tunable delay line configured to delay transmission of the pre-compensated third signal to the DSP by a sixth skew amount.

6. The skew compensation system of claim 5, wherein the first skew amount, the third skew amount, and the fifth skew amount have different values.

7. The skew compensation system of claim 5, wherein the second skew amount, the fourth skew amount, and the sixth skew amount have different values.

8. The skew compensation system of claim 5, wherein at least one of the second transmitter-side tunable delay line, the second receiver-side tunable delay line, the third transmitter-side tunable delay line, and the third receiver-side tunable delay line is a delay tunable cable, an integrated delay-control circuit, time-domain signal processing, or frequency-domain signal processing.

9. The skew compensation system of claim 5, wherein the second signal and the third signal are transmitted according to a protocol selected from Data Over Cable Service Interface Specification (DOCSIS), Ethernet Passive Optical Network (EPON), Radio Frequency Over Glass (RFoG), Gigabit Passive Optical Network (GPON), Satellite Internet, 4G, 5G, and 6G.

10. The skew compensation system of claim 5, wherein the first, second, and third receiver-side tunable delay lines are each disposed between analog to digital converters (ADC) and the DSP.

11. The skew compensation system of claim 5, wherein the third skew amount, the fourth skew amount, the fifth skew amount, and the sixth skew amount are each determined relative to a reference signal.

12. A method of synchronizing signals transmitted from a transmitter to a receiver in operable communication with one another, the method comprising:
   processing a reference signal and a first signal each detected at the receiver to solve a cross-correlation matrix to determine a first skew amount contributed by the transmitter and a second skew amount contributed by the receiver;
   providing a first transmitter-side tunable delay line delaying transmission of the first signal by the first skew amount, thereby producing a pre-compensated first signal; and
   providing a first receiver-side tunable delay line delaying transmission of the pre-compensated first signal to a digital signal processor (DSP) of the receiver by the second skew amount, thereby producing a final signal that is both pre-compensated and post-compensated.

13. The method of claim 12, wherein the first skew amount and the second skew amount are obtained from the same test data.

14. The method of claim 12, wherein the first signal is transmitted according to a protocol selected from Data Over Cable Service Interface Specification (DOCSIS), Ethernet Passive Optical Network (EPON), Radio Frequency Over Glass (RFoG), Gigabit Passive Optical Network (GPON), Satellite Internet, 4G, 5G, and 6G.

15. The method of claim 12 further comprising:
   providing a second transmitter-side tunable delay line configured to delay transmission of a second signal by a third skew amount, thereby producing a pre-compensated second signal and a third transmitter-side tunable delay line configured to delay transmission of a third signal by a fifth skew amount, thereby producing a pre-compensated third signal; and
   providing a second receiver-side tunable delay line configured to delay transmission of the pre-compensated second signal to the DSP by a fourth skew amount and a third receiver-side tunable delay line configured to delay transmission of the pre-compensation third signal to the DSP by a sixth skew amount.

16. The method of claim 15, wherein the third skew amount, the fourth skew amount, the fifth skew amount, and the sixth skew amount are each determined relative to the reference signal.

17. The method of claim 15, wherein the first skew amount, the third skew amount, and the fifth skew amount have different values.

18. The method of claim 15, wherein the second skew amount, the fourth skew amount, and the sixth skew amount have different values.

19. The method of claim 15, wherein the DSP combines signals received from the first receiver-side tunable delay line, the second receiver-side tunable delay line, and the third receiver-side tunable delay line.

20. The method of claim 15, wherein the second signal and the third signal are transmitted according to a protocol selected from Data Over Cable Service Interface Specification (DOCSIS), Ethernet Passive Optical Network (EPON), Radio Frequency Over Glass (RFoG), Gigabit Passive Optical Network (GPON), Satellite Internet, 4G, 5G, and 6G.

\* \* \* \* \*